United States Patent
Efraty (10) Patent No.: US 11,198,096 B1
(45) Date of Patent: Dec. 14, 2021

(54) PRESSURE-EXCHANGE ASSISTED CLOSED CIRCUIT DESALINATION SYSTEMS FOR CONTINUOUS DESALINATION OF LOW ENERGY AND HIGH RECOVERY UNDER FIXED FLOW AND VARIABLE PRESSURE CONDITIONS

(71) Applicant: DESALITECH LTD, Kfar Saba (IL)

(72) Inventor: Avi Efraty, Har Adar (IL)

(73) Assignee: DESALITECH LTD, Kfar Saba (IL)

( * ) Notice: Subject to any disclaimer, the term of this patent is extended or adjusted under 35 U.S.C. 154(b) by 309 days.

(21) Appl. No.: 16/306,592

(22) PCT Filed: May 24, 2017

(86) PCT No.: PCT/IL2017/050577
§ 371 (c)(1),
(2) Date: Dec. 3, 2018

(87) PCT Pub. No.: WO2017/216785
PCT Pub. Date: Dec. 21, 2017

(30) Foreign Application Priority Data

Jun. 13, 2016 (IL) .......................................... 246233

(51) Int. Cl.
*B01D 61/06* (2006.01)
*B01D 61/02* (2006.01)
(Continued)

(52) U.S. Cl.
CPC ........... *B01D 61/06* (2013.01); *B01D 61/025* (2013.01); *B01D 61/12* (2013.01); *C02F 1/441* (2013.01);
(Continued)

(58) Field of Classification Search
CPC ...... B01D 61/06; B01D 61/025; B01D 61/12; B01D 2313/246; B01D 2317/04; C02F 1/441; F04F 13/00
See application file for complete search history.

(56) References Cited

U.S. PATENT DOCUMENTS

| 2008/0023410 A1 | 1/2008 | Efraty |
| 2010/0230352 A1 | 9/2010 | Oklejas, Jr. |

(Continued)

FOREIGN PATENT DOCUMENTS

| WO | 20050018782 A1 | 3/2005 |
| WO | 20120069892 A2 | 5/2012 |
| WO | 2015/190948 A1 | 12/2015 |

*Primary Examiner* — Dirk R Bass
(74) *Attorney, Agent, or Firm* — Soroker Agmon Nordman

(57) ABSTRACT

The inventive system and method comprises one or more batch closed circuit desalination (CCD) unit(s) linked by conducting lines and valves means to a pressure exchange (PE) means, such that each said CCD can be engaged periodically with said PE means for brine replacement by fresh pressurized feed, thereby, enable a continuous consecutive sequential batch desalination under fixed flow and variable pressure conditions of low energy and high recovery of unchanged flux. The inventive system and method opens the door to large scale CCD systems operated by predetermined fixed set points of pressurized feed low, cross-flow or module recovery, and system recovery, independent of each other, of infinite operational combinations and high flexibility for effective process optimization. The inventive system and method overcome former volume requirement limitations of large scale SWRO CCD installations.

2 Claims, 5 Drawing Sheets

[A] Disengaged Configuration

[B] Engaged Configuration (51) Int. Cl.
  *B01D 61/12* (2006.01)
  *C02F 1/44* (2006.01)
  *F04F 13/00* (2009.01)

(52) U.S. Cl.
  CPC ........ *F04F 13/00* (2013.01); *B01D 2313/246* (2013.01); *B01D 2317/04* (2013.01)

(56) References Cited

U.S. PATENT DOCUMENTS

| | | |
|---|---|---|
| 2011/0133487 A1 | 6/2011 | Oklejas, Jr. |
| 2011/0203987 A1 | 8/2011 | Friedrichsen et al. |
| 2014/0238938 A1 | 8/2014 | Sarp et al. |
| 2017/0216774 A1 | 8/2017 | Warsinger et al. |
| 2017/0239620 A1 | 8/2017 | Warsinger et al. |

Fig. 1A

[A] Disengaged Configuration

Fig. 1B

[B] Engaged Configuration

Fig. 2A

[A] NMEn Configuration

Fig. 2B

[B] N(2MEn) Configuration

Fig. 2C

[C] N(3MEn) Configuration

PRESSURE-EXCHANGE ASSISTED CLOSED CIRCUIT DESALINATION SYSTEMS FOR CONTINUOUS DESALINATION OF LOW ENERGY AND HIGH RECOVERY UNDER FIXED FLOW AND VARIABLE PRESSURE CONDITIONS

BACKGROUND OF THE INVENTION IN LIGHT OF PRIOR ART

Desalination of salt water solution feed (feed) by reverse osmosis (RO) can be divided broadly into plug flow and closed circuit batch techniques of conceptually different principles and operational modes. In plug flow desalination (PFD), a pressurize feed stream at inlet to a pressure vessel with semi-permeable membrane elements in line, a so-called module, splits at its outlet into two streams, one of a high salinity pressurized concentrate referred to as brine and the other of a low salinity non-pressurized permeate.

PFD is a continuous hydrodynamic process: wherein, permeate recovery depends on the number of lined elements in modules, separation energy of water from feed is depends on the permeation flux created by a fixed applied pressure greater than the osmotic pressure of said brine, and energy efficiency dependence on the ability to recycle the energy stored in the disposed brine by an energy recovery device (ERD). In simple terms, recovery in PFD depends on the number of lined elements in modules and the energy consumption on the feed source salinity, flux, and efficiency of ERD. PFD is practiced in various modifications including such with single-stage or multi-stage modules' designs and with partial concentrate recirculation in a closed or an open circuit. PFD processes, irrespective of their exact mode, are characterized by the flow balance expression $Q_f=Q_p+Q_b$ and the mass-balanced expression $Q_f*C_f=Q_p*C_p+Q_b*C_b$; wherein, Q stands for flow rate, C for total dissolved salt, and the subscript f for feed, p for permeate and b for brine. PFD desalination recovery (R) is expressed from flow rates or concentrations by $R=Q_p/Q_f*100=[(C_b-C_f-C_p)/C_b]*100$ from.

In contrast with PFD, closed-circuit desalination (CCD) is a batch desalination process made continued by consecutive sequential us wherein the entire concentrate is recycled from outlet(s) to inlet(s) of module(s) after diluted with fresh pressurized feed which proceeds with identical flow rates of pressurized feed ($Q_f$) and permeate ($Q_p$) and with the increased salinity of the closed circuit. The progression of CCD since inception is well documented in the patent literature starting with the U.S. Pat. No. 4,814,086 by Bratt and the U.S. Pat. No. 4,983,301 by Szucz of al. patents of similar 1987 priority dates for the making of batch CCD processes continuous by means of " . . . two relatively large capacity tanks . . . " which are alternately engaged with the closed circuit and thereby, enable consecutive sequential closed circuit desalination under fixed pressure conditions without the need to stop the batch process for recharge. After filled with brine at the end of a batch desalination sequence, the disengaged tank is separated from the closed circuit by valve means, decompressed, its brine replaced by fresh feed at near atmospheric pressure, and then sealed, compressed and left on stand-by for the next engagement by a procedure involving hydrostatic compression/decompression steps of negligible energy demand/loss which circumvent the need for energy recovery from pressurized brine flow as in PFD. While saving the need for ERD means, the drawback of this approach rest with the need for large volume high pressure tanks which makes this approach of prohibited economic feasibility.

Batch CCD under fixed flow and variable pressure conditions and such a consecutive sequential process with two alternating contains was taught first in PCT/IL2002/000636 by Efraty and demonstrated the unique operational principles of this approach on a linear time scale with each CCD sequence comprises cycles of fixed time duration, defined by unchanged flow rates of feed (=permeate) and cross-flow and in a closed circuit of a fixed intrinsic volume. Each CCD cycle under such conditions is characterized by fixed inlet and outlet module concentrations, applied pressure requirement, specific energy consumption. and quality of produced permeates, with an overall sequence performance per a defined recovery expressed by the average cycle performance. CCD under fixed flow and variable pressure conditions takes place with fixed flux, module recovery (MR), and sequence recovery (R) operational set-points with flux defined by $Q_p(=Q_f)$ and membranes' surface area, $MR=Q_f/(Q_f+Q_{CP})*100$ where $Q_{CP}=Q_p*(100-MR)/MR=Q_f*(100-MR)/MR$, and $R=100*[\Sigma Q_p/(\Sigma Q_p \Sigma Q_p+V_i)]*100=100*[\Sigma Q_f/(\Sigma Q_f+V_i)]$ where $\Sigma Q_f$ and $\Sigma Q_p$ are the identical cumulative volumes of feed and permeate, respectively. R could also be estimated from electric conductivity (E), since $R \approx 100*[E_b-E_f-E_p)/E_b]$ where subscript b stands for brine effluent, f for feed, and p for average permeate over the entire sequence. CCD sequence recovery (R) under fixed flow and variable pressure conditions is a function of the CCD cycle-number, irrespective of the number of elements per module. In a CCD system of fixed operational set-points (e.g., flux, MR and R), CCD cycle time duration ($T_s$) is a fixed entity expressed by $T_s=V_i/Q_{CP}$ and therefore, variations of applied pressure and salinity of constituents during CCD batch sequences are linear of the time scale and exponential on the recovery scale. A noteworthy difference between fixed pressure variable flow approach taught by either Bratt and/or Szucz et al. and the fixed flow variable pressure approach taught by PCT/IL2002/00063 relates to the lower energy consumption prospects of the latter; however, the principle obstacle of these techniques irrespective of their mode of operation arises from the need of two large volume high pressure containers tanks with lines and valve means to enable their alternating actuation which limits such designs only for small scale desalination apparatus.

The next stage in the progression of the CCD technology in PCT/IL2004/000748 by Efraty teaches apparatus and method for continuous consecutive sequential CCD under fixed flow and variable pressure conditions with a single container. According to this invention, a single container of the intrinsic volume of the closed circuit is occasionally engaged with the closed circuit for concentrate brine replacement by fresh feed for a single cycle duration when the consecutive sequential batch desalination process reaches its designated sequence recovery as manifested by maximum applied pressure and/or electric conductivity (EC) of recycled concentrate; and thereafter, the container is disengaged from the closed circuit, decompressed, recharged with fresh feed at near atmospheric pressure, and then, sealed, compressed by one-end connection to the closed circuit, and left on stand-by to the next engagement. CCD according to this invention is carried with high energy conversion efficiency without need for ERD, since the compression/decompression steps of the single container take place under hydrostatic conditions with negligible energy losses. The low energy consumption of CCD under fixed flow and variable pressure conditions arises from the combination of average energy consumption along the sequential recovery scale with near absolute energy conversion efficiency, and this approach is unmatched by conventional PFD techniques. This technology is not confined to a specific salt water solution feed source is particularly effective for seawater desalination where energy consumption is an essential economic parameter; however, the application of this technology is limited to relatively small units in light of the volume requirement size of the pressure container to match the intrinsic volume of the closed circuit section of pressure vessels, elements and conduit lines.

Apparatus and method for continuous consecutive sequential CCD under fixed flow and variable pressure conditions without need of a container is described in PCT/IL2005/000670 by Efraty and teaches the integration of CCD and PFD for high recovery low energy desalination with the former mode experienced under fixed flow and variable pressure conditions most of the time (>85%) and the latter mode applies for brief brine flush-out of concentrate brine without stopping desalination. The CCD-PFD approach is of particularly relevant for high recovery (88%-97%) low energy desalination of brackish water, since requires simple inexpensive apparatus of high cost effectiveness and save both water for reuse and energy.

Another reported aspect of CCD described in PCT/IL2010/000537 by Efraty teaches a hybrid system comprising a conventional PFD multi-stage BWRO design and a retrofit CCD unit at the brine effluent outlet of the former which utilizes the power stored in the pressurized brine stream for its further desalination and thereby, lost energy is saved and used to increased the water recovery of y of the entire system. The CCD retrofit is a non-autonomous unit intended for integration with conventional PDF multi-stage BWRO units in order to improve their performance, and can be viewed as an energy recovery device with saved energy applied for the further desalination of the feed source beyond the limits of the conventional PFD process.

Depletion/deterioration of fresh water supply sources in many parts of the world as result of rising standards of living, a growing global population, climate changes in large regions worldwide prompted by the progression of the global "green-house effect", and increased manmade pollution of ground and surface water sources, created the needs for water treatment and waste water recycling as well as for increased reliance on seawater desalination for fresh water supplement. SWRO is the desalination method of the lowest energy consumption and increased reliance SWRO for fresh water supplement is already evident worldwide by the growing number of such plants of small to mega size production capacity, and this trend is expected to intensify in the future. Desalination of Ocean seawater (35,000 ppm) of 50% recovery at flux of 13 lmh in large modem SWRO-PFD desalination plants equipped with advance ERD means proceeds with specific energy (SE) in the range of 2.45-3.00 kWh/m, with energy accounting to 35%→70% of the desalination costs as function of the electricity tariff. By analogy, SWRO-CCD under the same flux and recovery conditions using the PCT/IL2004/000748 inventive method was shown to proceed only with SE<1.75 kWh/m$^3$—distinctly lower energy consumption compared with that the of conventional SWRO-PFD methods; however, said CCD approach with an engaged/disengaged side container is confined to small units under 1,000 m$^3$/day production capacity.

The present invention hereinafter describes CCD systems of large production capacity under fixed flow and variable pressure conditions where brine placement with fresh feed inside the closed circuit takes place by Pressure Exchange (PE) means.

SUMMARY OF THE INVENTION

The present invention proposes systems comprising one or several batch closed circuit desalination (CCD) units integrated with pressure exchange (PE) means made of one PE or several PE units with their respective inlets and outlet lines connected in parallel; and conducting lines with valve means to enable a periodic engagement of each said CCD unit with said PE means for brine replacement with fresh feed, while consecutive sequential desalination under fixed flow and variable pressure conditions in said batch CCD unit(s) is continued nonstop with unchanged membrane performance of predetermined fixed flux, cross-flow, and recovery, independent of each other.

The method of operation of said inventive system takes place by the actuation of valve means triggered by signals of on-line monitored data such as of pressure, flow/volume, and electric conductivity: whereby, each batch CCD unit at its designated recovery is engaged with said PE means for brine replacement with fresh feed and thereafter, disengaged when the entire closed circuit volume of the said engaged CCD unit is replaced. According to the inventive method, a sequential maximum applied pressure signal per each said batch CCD unit manifesting the attainment of the designated recovery, will trigger an engagement procedure with the PE means for brine replacement by fresh feed and engagement termination will take place when the monitored displaced brine volume matches the intrinsic volume of said CCD unit. PE means in the inventive system are either active or idle and can be actuated continuously and alternately when the number of batch CCD units in the system design is also the required number of CCD cycles to attain a designated recovery.

The application of the inventive system and method for seawater desalination will enable for the first time the design of large scale systems for under fixed flow and variable pressure CCD conditions of exceptionally low energy consumption by overcoming the volume limitations of design according to prior art teachings. The application of the inventive system and method for brackish water desalination of high recovery and low energy under fixed flow and variable pressure CCD conditions will enable for the first time the design of large scale systems with unchanged membrane performance and flux in contrast with prior art teaching of a similar approach on the basis of a two-step consecutive sequential process wherein CCD is experience most of the time with brief PFD steps of lower flux apply between batch desalination sequences for concentrate brine replacement with fresh feed—constant flux according to the present invention instead of changing flux in the two-step process of prior art should enable a higher system productivity and a longer membrane durability compared with the former CCD-PFD prior art technique.

DETAILED DESCRIPTION OF THE INVENTION

The inventive step of the present invention relates to the use of PE means for brine replacement with fresh pressurized feed in batch CCD units operated consecutive sequentially under fixed flow and variable pressure conditions. Prior art leaching of brine replacement with fresh pressurized feed in said consecutive sequential batch CCD process through a disengaged/engaged single container (CCD-SC) proceeds with negligible hydrostatic compression/decompression energy losses with theory predicted near absolute energy conversion efficiency which was ultimately confirmed experimentally. PE means comprise mechanical unit of two inlets and outlets wherein a pressurized effluent stream actuates a feed pressurizing device and the efficiency of such a unit depends on the inlet-outlet pressure difference of said effluent stream, the hydraulic efficiency of said feed pressurizing device, and the degree of mixing between said brine effluent and feed streams. Isobaric ERD based of positive displacement principles of conventional PFD plants (e.g., PX, DWEER, etc.) are noted for their high hydraulic efficiency (93%-96%); however, the overall energy conversion efficiency of said ERD should be only ~90% or less if account is taken of their inlet-outlet pressure-difference, mixing, and plausibly mechanical and flow induced pressure losses. Accordingly, the integration of the relatively small size PE means. such as the isobaric-ERD tools, into batch CCD units of fixed flow and variable pressure operational mode should enable a design flexibility of large production cost effective units by circumventing the need for large volume side containers; however, this will be done at an expense of a somewhat greater SE (~10%) compared with that of CCD with a side container (CCD-SC). For example, the energy consumption projection of the inventive method (CCD-PE) for large scale Ocean seawater (35,000 ppm) desalination of 50% recovery at 13 lmh of ~1.92 kWh/m$^3$ is expected to be 10% higher than that demonstrated for a small scale CCD-SC unit (1.75 kWh/mW) and ~22% lower than that of the most efficient SWRO-PX large commercial plant (2.45 kWh/m$^3$l) located in Partt (Australia).

Figure 1A:
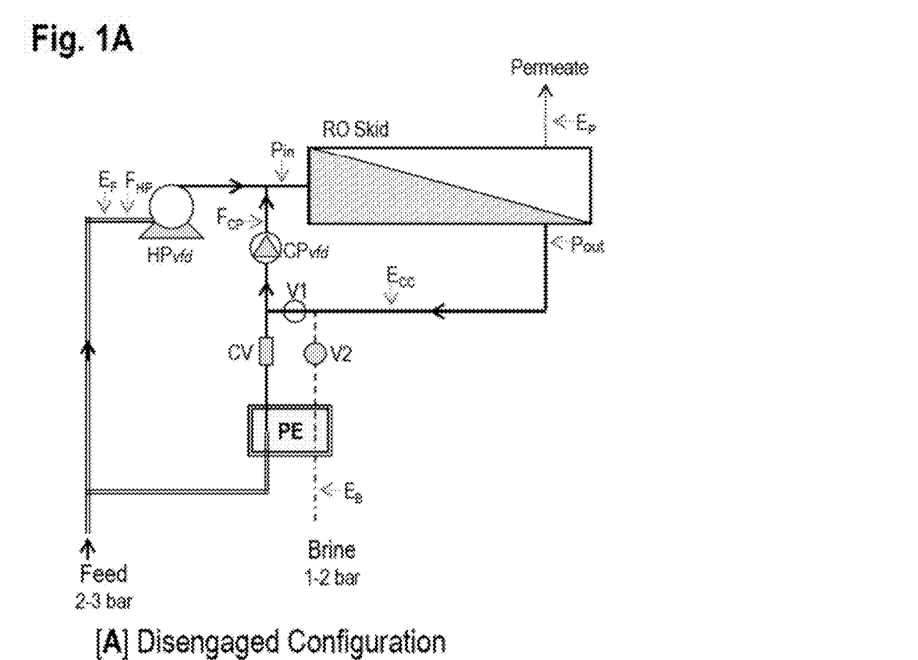
FIG. 1A: A schematic diagram of an inventive system for continuous closed circuit desalination comprising a batch CCD unit, a pressure exchange (PE) unit, and conducting lines and valve means between CCD and PE, showing an actuation mode where both said units are disengaged.
Figure 1B:
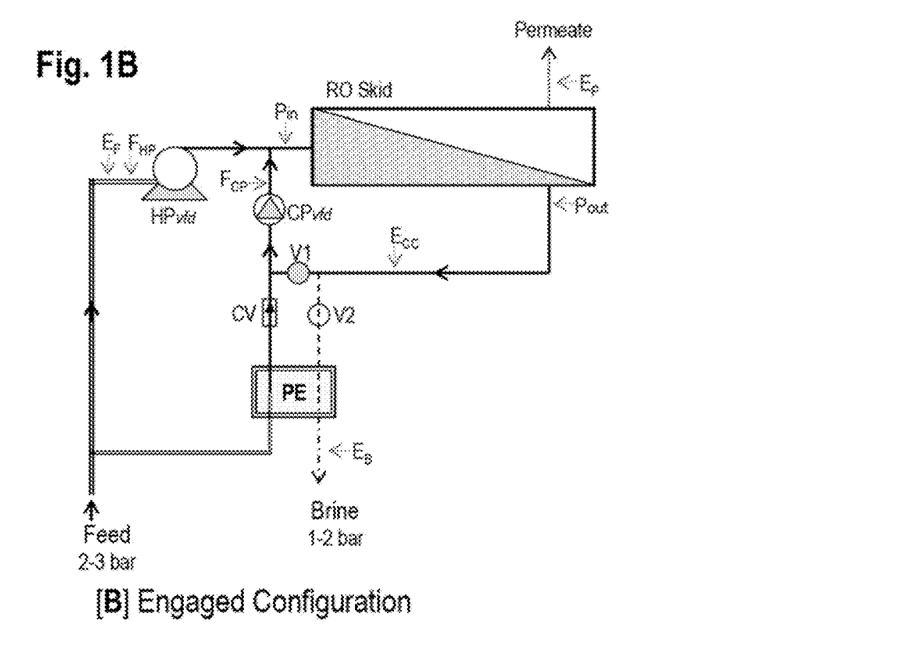
FIG. 1B: A schematic diagram of an inventive system for continuous closed circuit desalination comprising a batch CCD unit, a pressure exchange (PE) unit, and conducting lines and valve means between CCD and PE, showing an actuation mode where both said units are engaged.

An integrated system of a batch CCD unit for fixed flow and variable pressure operation with PE means according to one of the preferred embodiments of the inventive system disclosed schematically in FIG. 1 (AB), shows a single batch CCD unit, a single PE unit, conducting lines in each of said units and those between them, and the valve means and monitoring means whereby said system is actuated continuously under the designated flow and pressure conditions with performance continuously monitored to enable a process control and detection of male functions if occurred. The conducting lines in the drawing are distinguished from each other to facilitate the distinction of their function, with flow direction in lines indicated by arrows. The two-mode actuation of the inventive system; wherein, said CCD and PE units are either disengaged or engaged, are displayed in FIG. 1A and FIG. 18, respectively. The batch CCD unit in FIG. 1(AB) comprises a RO skid of a single module with a selected number of membrane elements, or of multitude of such modules with their respective inlet and outlet lines connected in parallel; a closed circuit line for concentrate recycling from outlet(s) to inlet(s) of said module(s) by means of a circulation pump (CP) equipped with a variable frequency drive (vfd) means to enable a selected fixed cross-flow ($Q_{CP}$) in said batch CCD unit; a high pressure feed pump (HP) equipped with a variable frequency dive (vfd) means with its inlet line for feed and outlet line for pressurized feed to enable the a selected constant flux under variable pressure conditions irrespective of cross-flow; a line(s) for permeate release from said module(s) in said batch CCD unit; and a single PE means with its inlet line of pressurized concentrate brine, inlet line of feed, outlet line of decompressed concentrate brine, and outlet line of pressurized feed. Other features in FIG. 1(AB) include the followings: the connecting lines from said closed circuit line of said batch CCD unit to the inlet line of pressurized concentrate brine and to the outlet line of pressurized feed of said PE means; actuated valve means [V1, V2, and one-way check valve (CV)]; a flow/volume monitoring means on inlet line to HP ($F_{HP}$) and on outlet line off CP ($F_{CP}$); pressure monitoring means on inlet line ($P_{in}$) to module(s) and on outlet line ($P_{out}$) off module(s); and electric-conductivity monitoring means on permeate outlet line ($E_P$), feed inlet line to HP ($E_{HP}$), brine effluent line off PE ($E_S$), and recycled concentrate in the closed circuit line ($E_{CC}$).

Figure 2A:
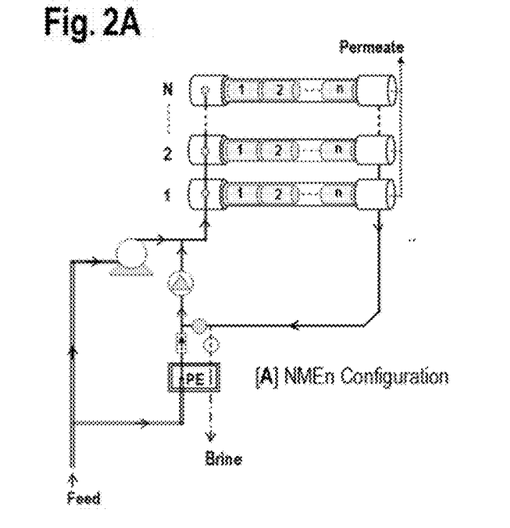
FIG. 2: A schematic diagram of the inventive system for continuous closed circuit desalination comprising a batch CCD unit, a pressure exchange (PE) unit, conducting lines and valve means between CCD and PE during an engagement mode, and RO skids of different plausible configurations such as NNEn [A], N(2MEn) [B] and, N(3MEn) [C], where MEn stands for a module containing and n elements and N for vertically fed of one. two and three horizontally linked modules, respectively.
Figure 2B:
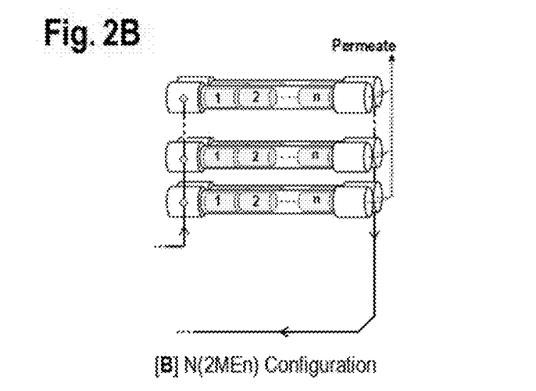
Figure 2C:
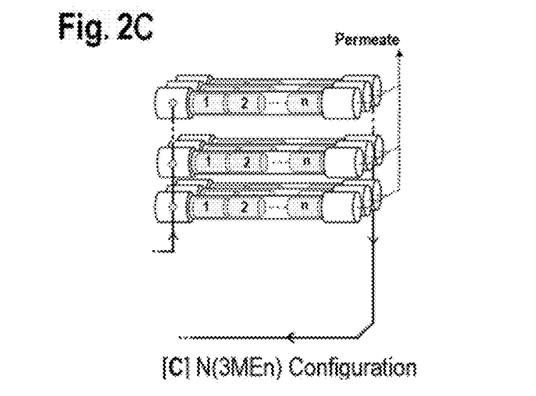

The RO skid design of said batch CCD unit in the preferred embodiment of the inventive system in FIG. 1(AB) is outlined with further details in FIG. 2(A-C). In said RO skids, the respective inlet and outlet lines of modules are connected in parallel to a single outlet line and a single inlet line which are part of said closed circuit line or concentrate recycling. Identical flow distribution to inlet(s) and off outlet(s) of module(s) in said RO skids under fixed low and variable pressure conditions implies an equivalent module performance, irrespective of the number of modules in the design provided that all the modules comprise of the same number of elements. Alignment of modules in said RO skids is possible in the vertical and/or horizontal configurations displayed in FIG. 2(A-C); wherein, FIG. 2A shows the vertical stacking of N modules of the NMEn configuration with their respective inlet and outlet tines connected in parallel; FIG. 20 shows the vertical stacking of N units, each comprises two horizontally inked modules, of the N(2MEn) configuration with respective inlet and outlet lines of all modules connected in parallel; and FIG. 3B shows the vertical stacking of N units, each comprises three horizontally linked modules, of the N(3MEn) configuration with respective inlet and outlet lines of all modules connected in parallel. The basic MEn unit in said configurations is of a module design comprising of a pressure vessel with n membrane elements (E) inside, with or without an additional empty volume inside pressure vessels created by spacers which is part of the free intrinsic volume of said module unit and that of the closed circuit of the entire system configuration—the free intrinsic volume of said module unit is an essential structural parameter which defines the fixed cycle duration during a batch CCD process under fixed flow and variable pressure conditions.

The method of actuation of the preferred embodiment of the inventive system displayed in FIG. 1(AB) and FIG. 2(A-C) proceeds by a continuous two-mode consecutive sequential process under fixed flow and variable pressure conditions according to predetermined set-points of flux, module recovery (MR), and system recovery (R), or parameters derived from said set points such as fixed pressurized feed flow rate ($Q_{HP}$) instead of flux, fixed cross-flow rate ($Q_{CP}$) instead of MR [$Q_{CP}=Q_{HP}*(100-MR)/MR$], and maximum applied pressure ($p_{max}$) instead of R. During said two-mode consecutive sequential process, engagement of batch CCD unit with PE means takes place only part of the time, to enable replacement of brine by fresh pressurized feed at the predefined desired system recovery from the intrinsic closed circuit volume ($V_i$) of system. Flow through said PE means during engagement ($Q_{PE}$) is the same as $Q_{CP}$. CCD operation of unchanged flux, MR, and R in a fixed intrinsic volume ($V_i$) proceeds by CCD cycles of constant time duration ($V_i/Q_{CP}$); wherein, recovery is a function of number of CCD cycles, or their cumulative batch sequence time intervals, with periodic engagement between said CCD and PE units to enable complete replacement of concentrate brine by fresh feed is of one CCD cycle duration ($V_i/Q_{CP}$) per a consecutive sequence. It should be pointed out again that the PE means are activated once per sequence for a single CCD cycle time duration ($V_i/Q_{CP}$), remain inactive during the rest of the time, and the frequency of PE means is function of recovery—declined frequency with increased recovery.

Actuation of the preferred inventive system embodiment displayed in FIG. 1(AB) and FIG. 2(A-C) takes place by means of operational set-points (e.g., flux, MR and R or their derivatives) and online monitored data. The control-board actuation of said system relates to CCD and PE engagement/ disengagement by the valve means. Inactive PE means is said system (FIG. 1A) implies an opened V1 and a closed V2 valve means; whereas, the activation of the PE means is achieved by the simultaneous closure of V1 and opening of V2 valve means in said system (FIG. 16). Accordingly, reaching the desired recovery will be manifested by a defined maximum applied pressure ($p_{max}$) signal, or by a defined maximum electric conductivity signal of recycled concentrate ($E_{max}$), and each said on-line monitored signals may apply to trigger PE engagement with the batch CCD unit for brine replacement with fresh feed without stopping desalination. The termination of the engagement may proceed after a single CCD cycle duration ($V_i/Q_{CP}$), since the fixed flow rates (HP and CP) in the system remain unchanged. An alternative engagement termination signal may relate to the monitored CP volume during engagement ($\Sigma V_{CP}$) with a termination signal prompted when $\Sigma V_{CP}=V_i$.

Apart from signals for valve means actuations, the monitoring means cited hereinabove in the preferred embodiment of the inventive system in FIG. 1(AB) also serve for the follow-up of the sequential CCD performance characteristics of pressure, flow rates, and electric conductivity which provide valuable information concerning of the development of fouling an/or scaling conditions in membranes and male function warnings specific system's components. It should also be pointed out that the reference to a single PE unit in FIG. (AB) and FIG. 2(A-C) is made for clarity and simplicity and that such a preferred embodiment of the inventive system may comprise of many such PE units of a simultaneous actuation mode as long as their respective inlet and outlet lines are connected in parallel according to the schematic drawing in FIG. 3.

According to the preferred embodiment of the inventive system in FIG. 1(AB) and FIG. 2(A-C), the batch CCD unit operates continuously under fixed flow and variable pressure conditions while the PE unit operates periodically, once during each sequence and remains idle during the rest of the time. The frequency of PE actuation is defined by the number of identical CCD cycles ($\varphi$) required to reach a designated sequential recovery (R) with $V_i/Q_{CP}$ expressing the active period per sequence of said PE unit and $(\varphi-1)*(V_i/Q_{CP})$ the non-active period of said unit with percent idle time expressed by $100*(1-1/\varphi)$. In CCD under fixed flow and variable pressure conditions, the term $\varphi$ is defined by the selected R and MR set points, with sequential time period defined by R and the number of CCD cycles experienced during said sequence period determined by MR, or more specifically by $Q_{CP}$, with a faster selected cross-flow manifested by a lower MR value, a larger number of CCD cycles ($\varphi$) per given R, and a shorter cycle period. The aforementioned dependencies in the context of the inventive system in FIG. 1(AB) and FIG. 2(A-C) of a typical brackish water source (2,000 ppm NaCl) at 20 lmh with 75%, 85%, and 95% recovery are illustrated, amongst other, in Example-1 (Table 1). The preferred embodiment of the inventive system in FIG. 1(AB) and FIG. 2(A-C) when applies to seawater CCD of 50% recovery at 13 lmh flux proceeds with few CCD cycles (e.g., 2-4) and a greater actuation frequency of the PE unit(s), with less idle time in between sequence.

The CCD performance effectiveness under fixed flow and variable pressure conditions of the preferred embodiment of the inventive system in FIG. 1(AB) and FIG. 2(A-C) depends on a suitable selection of components with emphasis on the PE and CP units, valve means and an effective control board program. The said PE unit should be of a high hydraulic efficiency (>93%) not affected the changing pressure under constant flow conditions and of a fast starting response when engaged with the closed circuit of the batch CCD unit. Said engagement takes place when said batch CCD unit reaches its maximum applied pressure with an unchanged CP cross-flow rate (fixed $Q_{CP}$), under which conditions a fast start of said PE unit is expected, pending a quick response of the actuated valve means in the system. The function of $CP_{vdf}$ in FIG. 1(AB) and FIG. 2(A-C) is to maintain a fixed cross-flow rate in said batch CCD unit and this implies enough power to overcome the module(s) pressure difference ($\Delta p$) when said batch CCD and PE units are disengaged as well as the to provide a pressure supplement ($\Delta p_{PE}$) when both said units are engaged, where $\Delta p_{PE}$ is the pressure loss in said PE unit. The vfd means in said $CP_{vdf}$ should be sufficiently responsive to enable a near constant cross-flow during the engaged/disengaged modes in the inventive system.

Figure 4:
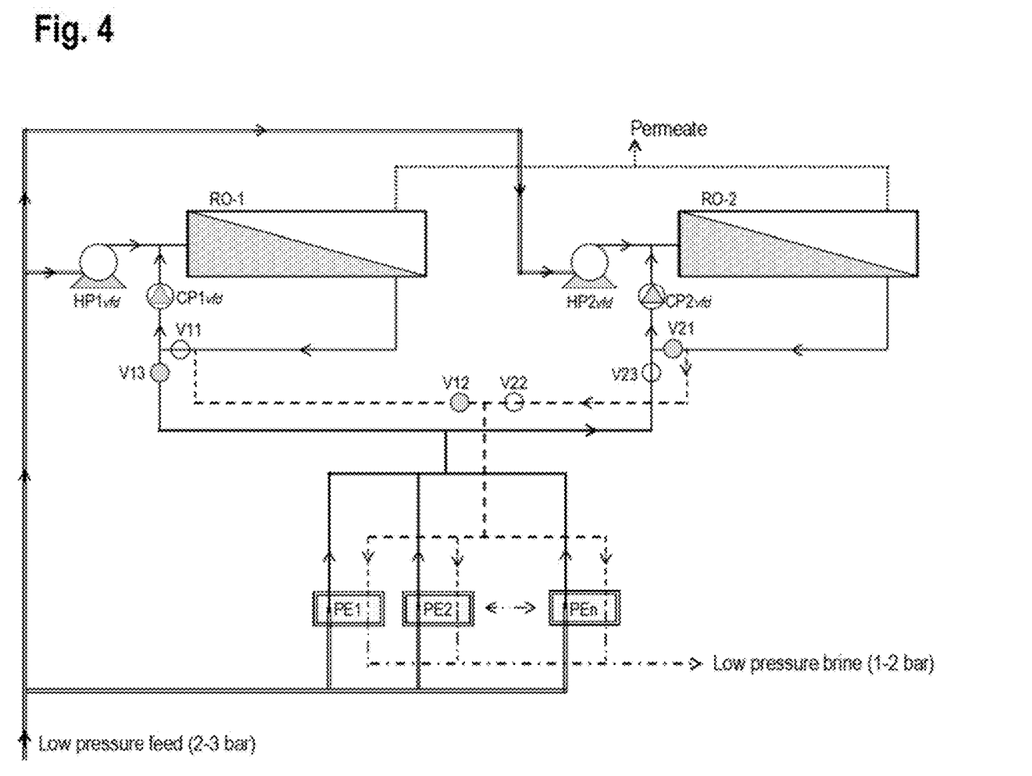
FIG. 4: A schematic diagram of the inventive system for continuous closed circuit desalination comprising two batch CCD units, pressure exchange (PE) units, and the conducting lines and valve means between them. showing an actuation mode where one of the CCD units (RO-1) is disengaged from the PE means while the other unit (RO-2) is engaged with said PE means undergoing brine replacement with fresh feed, whereby continuous operation of both CCD units under fixed flow and variable pressure conditions is enabled by the alternating engagement of said units the with the PE means.

Another preferred embodiment of the inventive system in FIG. 4 describes the integration of two batch CCD units with the same pressure exchange means comprised of either one such unit (PE) or multitude of PE units (PEn) with their respective inlets and outlets connected in parallel. The engagement of the CCD units and PE means in said inventive system is enabled alternately, rather than simultaneously, through the valve means, while desalination is continued nonstop in both CCD units. The features in said batch CCD units, labeled RO-1 and RO-2, are same as already explained hereinabove for the preferred embodiment of the inventive method in FIG. 1(AB) and FIG. 2(A-C). Each batch CCD unit in FIG. 4 is autonomous and can be engaged alternately with said PE means for brine replacement by fresh feed through a concentrate line off its closed circuit line and valve means. In simple terms, PE means in of the preferred embodiment in FIG. 4 can be engaged with either RO-1 or with RO-2, one at a time, through their respective conducting lines and valves means, and remain idle when not engaged. Three operational modes are enabled by valve means actuation (opened closed positions) of the inventive system under review (FIG. 4) as followed: Continuous desalination while PE means are idle (Opened position→V11 and V21; Closed position→V12, V13, V22 and V23); Continuous desalination with PE means engaged with RO-2 (Opened position→V11, V22 and V23. Closed position→V21, V12 and V13); and Continuous desalination with PE means engaged with RO-1 (Opened position→V21, V12 and V13. Closed position→V11, V22 and V23). Valve means V13 and V23 can be replaced by one-way check valve means, since the outlet line from said PE means is always under a somewhat reduced pressure (2-3 bare) than that of the recycled concentrate inside said batch CCD units. The actuation mode of the inventive system displayed in FIG. 4 is that where RO-1 is disengaged and RO-2 engaged with the PE means.

A single unique mode of operation of the preferred embodiment of the inventive system in FIG. 4 exists when both batch CCD units in the design are of identical configuration and operate identical two-cycle CCD consecutive sequences of same flux, module recovery (MR), recovery (R), sequence time duration $(2*V_t/Q_{CP})$, and cycle time duration $(V_t/Q_{CP})$. In this event, the inventive system in FIG. 4 is actuated with the PE means operated continuously, half the time with said RO-1 and half the time with said RO-2. Moreover, the entire conducting lines between the CCD units and pressure PE means in FIG. 4 remain under pressure, implying a small pressure difference during the actuation of the valve means in the system and the ability to achieve fast actuation of valves without damage. The monitoring means in the inventive system in FIG. 4, although not cited, are of the same type and located in the same respective positions as revealed for the single batch CCD unit in FIG. 1(AB).

The inventive system in FIG. 4 for the simultaneous actuation of two batch CCD units with the same PE means can operate with one batch CCD unit with idle PE means when not engaged. This option, enabled by valve control means, implies the ability to stop one of the two batch CCD units in the system for maintenance and/or repair while the other is maintained operational.

Figure 5:
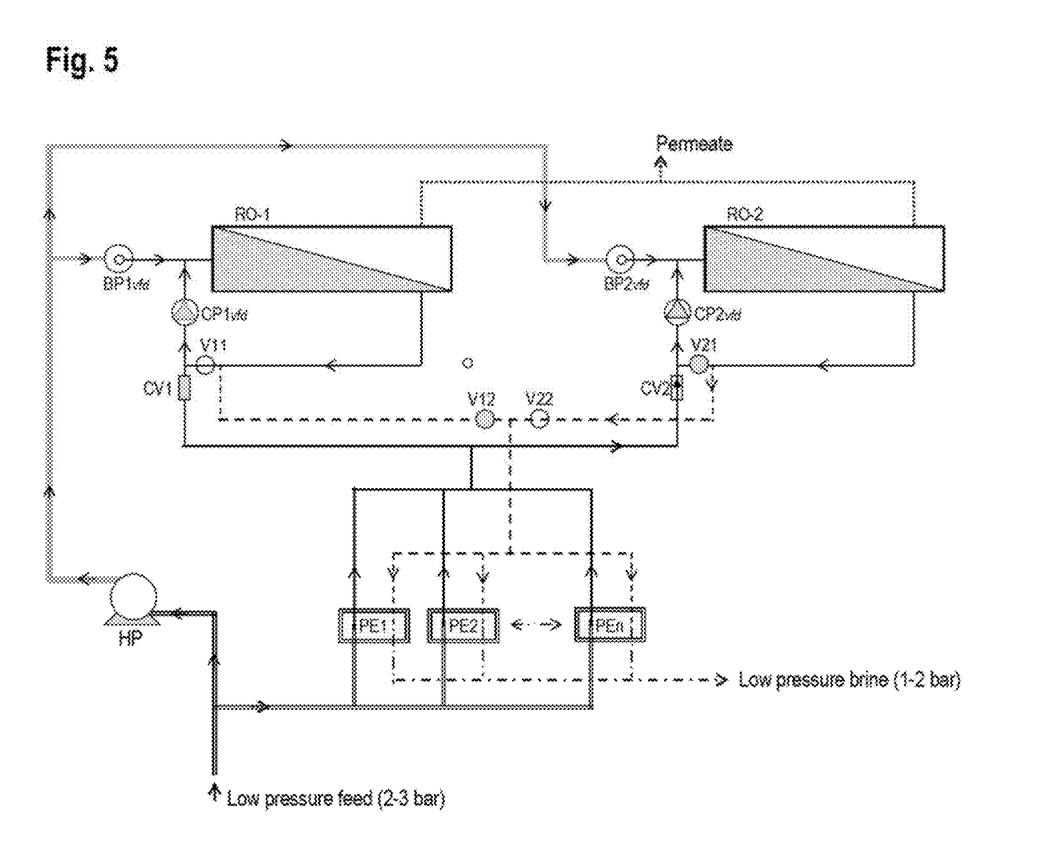
FIG. 5: A schematic diagram of the inventive system as in FIG. 4; except that both units are supplied with pressurized feed by the same high pressure pump (HP) and the fixed flow variable pressure operation within each CCD unit is created by means of their separate booster pumps (BP).

A modified design of the preferred embodiment of the inventive system in FIG. 4 is revealed in FIG. 5; wherein, a single high pressure pump (HP) without vfd means supplies a fixed flow of the fixed minimum pressure required by the batch CCD units, with pressure boosting inside the module(s) of RO-1 and RO-2 to enable a fixed permeation flow operation achieved by means of the respective booster pumps $BP1_{vfd}$ and $BP2_{vfd}$, both equipped with vfd means to allow a fixed flow control. The monitoring means in the inventive system in FIG. 5, although not cited, are of the same type and located in the same respective positions as revealed for the single batch CCD unit in FIG. 1(AB).

Systems according to the inventive method may comprise many batch CCD units which engage with the same PE means sequentially, one at a time, for concentrate brine replacement with feed. Inventive systems with many identical batch CCD units operated under the same conditions, will engage the PE means continuously when the cycle-number (φ) to reach a designated recovery (R) is the same as the number of said batch CCD units. In this case, the sequence time duration of each said batch unit is expressed by $\varphi*V_t/Q_{CP}$) with cycle time duration of $V_t/Q_{CP}$ expressing the sequential periodic engagement with said PE means.

Figure 3:
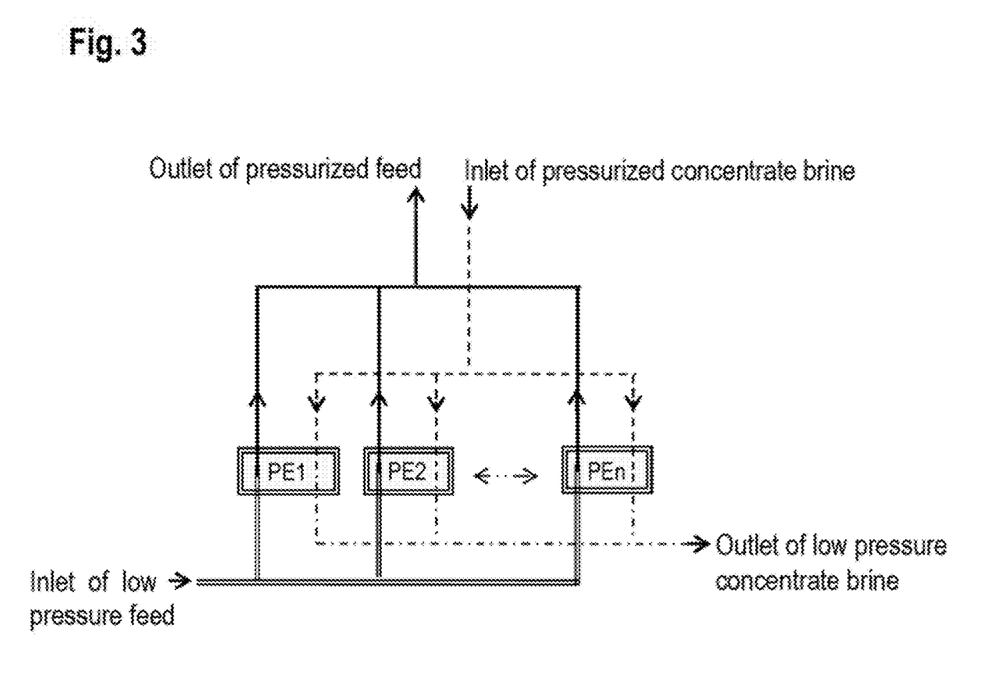
FIG. 3: A schematic diagram of multitude pressure exchange (PE) units with their inlets and outlets lines connected in parallel to enable their simultaneous actuation.

It will be understood to the skilled in the art that the inventive systems of the inventive method pertain to integration between batch CCD unit(s) of fixed flow and variable pressure mode of operation and PE means to enable periodic concentrate brine replacement by feed in said batch CCD unit(s) without stopping desalination, and that the preferred embodiments of the inventive systems in FIG. 1(AB), FIG. 2(A-C), FIG. 3, FIG. 4 and FIG. 5 are schematic and simplified and are not to be regarded as limiting the invention but as several examples of many for the diverse implementation of the invention. In practice, systems according to the inventive method may comprise many additional lines, branches, valves, and other installations and devices as deemed necessary according to specific requirements while still remaining within the scope of the invention's claims.

It will be understood to the skied in the art that means for pressurizing feed, boosting feed pressure, recycling of concentrate, pressure exchange, and flow manipulation are comprised of ordinary commercial components such as a pressure pump, a circulation pump, a booster pump, a pressure exchange device, and a valve device, or several such components that are applied simultaneously in parallel, or in line as appropriate. It is further understood that the referred monitoring means in FIG. 1(AB) are typical of al the inventive systems and that their signals essential for the actuation and control of specific components within said systems as well as for the entire systems. Noteworthy in particular in this context is the fixed flow operation of $HP_{vfd}$ and $CP_{vfd}$ in the batch CCD unit(s) of the inventive systems which is made possible through vid and flow monitoring means and that signals of such monitoring means apply to actuation of said valve means through a programmable control board whereby the entire operation is executed and controlled.

It will be obvious to the skill in the art that the design of the inventive systems is not confined by the number of modules and/or element-number per module and/or the type of modules and elements in each said batch CCD unit, nor by the number of said batch CCD units and/or number of pressure exchange units per inventive system, and therefore, said inventive systems could apply also for large scale desalination of low energy and high recovery of salt water solutions including at the level of seawater.

The inventive systems and methods pertain to the integration of batch CCD unit(s) with pressure exchange means through conducting lines with valve means into systems exemplified by the preferred embodiments in FIG. 1(AB), FIG. 2(A-C), FIG. 4 and FIG. 5 with monitoring and control means to enable continuous consecutive sequential CCD operation under fixed low and variable pressure conditions in compliance with predefined operational set-points of flux, module recovery and sequence recovery, which are independent of each other. The specified mode of operation is intended to enable continuous desalination of low energy both CCD units simultaneously at the same average set-point flux. In simple terms, the PE means in the design (FIG. 4) are operated nonstop and alternately engaged with each CCD unit for 2.0 minute duration. The various design and performance aspects of the exemplified system of the preferred embodiment are summarized in Table 1.

TABLE 1

Illustration of the design and performance aspects of systems with 4MEn (n = 2-6) batch CCD unit configurations according to the preferred embodiment of the inventive system in FIG. 4, as applied for the desalination of seawater (35,000 ppm) with 50% recovery.

|  | Example Number | | | | |
| --- | --- | --- | --- | --- | --- |
|  | #1 | #2 | #3 | #4 | #5 |
| Membrane permeability coefficient - lmh/bar | 1.798 | 1.798 | 1.798 | 1.798 | 1.798 |
| Membrane salt diffusion coefficient - lmh | 0.087 | 0.087 | 0.087 | 0.087 | 0.087 |
| Module element-number | 6 | 5 | 4 | 3 | 2 |
| Module spacer-number | 2 | 3 | 4 | 5 | 6 |
| Module intrinsic volume - liter | 164 | 180 | 197 | 213 | 229 |
| Module-number per batch CCD unit | 42 | 42 | 42 | 42 | 42 |
| Number of batch CCD units per system | 2 | 2 | 2 | 2 | 2 |
| Sequence recovery (R) - % | 50.0 | 50.0 | 50.0 | 50.0 | 50.0 |
| Module recovery (MR) - % | 33.3 | 33.3 | 33.3 | 33.3 | 33.3 |
| av-Element recovery (AER) - % | 6.5 | 7.8 | 9.6 | 12.6 | 18.3 |
| av-Concentration Polarization factor (av-pf) | 1.11 | 1.13 | 1.17 | 1.23 | 1.34 |
| av-Flux, lmh | 13 | 13 | 13 | 13 | 13 |
| Cycle-number per CCD sequence | 2.00 | 2.00 | 2.00 | 2.00 | 2.00 |
| CCD sequence duration - min. | 3.09 | 4.08 | 5.56 | 8.03 | 12.97 |
| CCD cycle duration - min. | 1.54 | 2.04 | 2.78 | 4.01 | 6.48 |
| Sequence engagement of CCD batch unit - min. | 1.54 | 2.04 | 2.78 | 4.01 | 6.48 |
| Minimum applied pressure - bar | 43.6 | 44.0 | 44.9 | 46.6 | 50.3 |
| Maximum applied pressure - bar | 55.5 | 56.1 | 57.3 | 59.7 | 64.6 |
| average applied pressure - bar | 49.5 | 50.1 | 51.1 | 53.1 | 57.4 |
| HP-vfd efficiency - % | 85 | 85 | 85 | 85 | 85 |
| CP-vfd efficiency - % | 75 | 75 | 75 | 75 | 75 |
| Pressure exchange unit efficiency - % | 95 | 95 | 95 | 95 | 95 |
| average energy consumption - kWh/m$^3$ | 1.831 | 1.803 | 1.805 | 1.853 | 1.990 |
| average TDS of permeates - ppm | 347 | 354 | 364 | 382 | 419 |
| CCD batch unit production - m$^3$/day | 3,208 | 2,673 | 2,139 | 1,604 | 1,069 |
| System production - m$^3$/day | 6,416 | 5,346 | 4,277 | 3,208 | 2,139 | high recovery also in inventive systems of large production capacity and high cost-effectiveness. Skilled in the art will recognize that the application of pressure exchange means with batch CCD unit(s) is non-obvious in the absence of any pressurized brine flow release during said CCD process as is case of conventional plug flow desalination techniques where pressure exchange means are being used continuously in a different mode.

While the invention has been described hereinabove in respect to particular embodiments, it will be obvious to those versed in the art that changes and modifications may be made without departing form this invention in its broader aspects, therefore, the appended claims are to encompass within their scope al such changes and modifications as fall within the true spirit of the invention.

Example-I

Seawater (35,000 ppm) CCD with operational set-points of 13 lmh flux, 33.3% module recovery (MR), and 50% recovery (R), according to the preferred embodiment of the inventive system in FIG. 4; wherein, each batch CCD unit comprises 42 module(s) of a specified number of elements per module of eight-section long pressure vessels. Both said CCD units in the system are of identical designs, operate with the same set-points, each executes a two-cycle consecutive sequences of 4.0 minute duration with a cycle period of 2.0 minute, and the PE means are operated continuously alternate every 2.0 minute from one CCD unit to the other, and thereby, allow a continuous desalination of Noteworthy features in Table 1: Inventive systems of MEn (2-6) module designs; a low energy consumption depending on module design [1.805-1.853 kWh/m$^3$ for MEn (n=3-6), and 1.990 kWh/m$^3$ for ME2]; permeate of 347→419 ppm TDS with salinity order manifesting increased concentration polarization of 1.11→1.34; fixed flux operation with production capacity manifesting the number of elements per module in the design; and maximum production capacity per system of two batch CCD 42*ME6 units (#1) of 6,416 m$^3$/day (2*3,208 m3/day). The data of columns #4, #5 signify unadvisable operational conditions from the stand point of concentration polarization (≥1.20).

Example-II

Salt water solution (2,000 ppm NaCl) batch CCD with operational set-points of 20 lmh flux; a selected module recovery (MR) manifesting a concentration polarization factor of 1.17; and a selected recovery (R) of 75%, or 85%, or 95%, according to the preferred embodiment of the inventive system in FIG. 1; wherein, said batch CCD unit comprises 42 modules of a specified number of elements per module [42MEn, n=4-6] made of eight-section long pressure vessel, and its operation proceeds by consecutive CCD sequences with periodic concentrate brine replacement by feed achieved by engagement with pressure exchange means for a single cycle duration; and thereafter, said pressure exchange means disengaged and remain idle until the next said engagement, with design and performance aspects said inventive systems summarized in Table 2.

TABLE 2

Illustration of the design and performance aspects according to the preferred embodiment of the inventive system in FIG. 1 with batch CCD unit configuration of 42MEn (m = 3-6) as applied to the desalination of a salt water solution of 2,000 ppm NaCl with 75%, 85% and 95% recovery.

| Example Number | #1.1 | #1.2 | #1.3 | #2.1 | #2.2 | #2.3 | #3.1 | #3.2 | #3.3 |
|---|---|---|---|---|---|---|---|---|---|
| Membrane permeability coefficient - lmh/bar | 4.985 | 4.985 | 4.985 | 4.985 | 4.985 | 4.985 | 4.985 | 4.985 | 4.985 |
| Membrane salt diffusion coefficient - lmh | 0.146 | 0.146 | 0.146 | 0.146 | 0.146 | 0.146 | 0.146 | 0.146 | 0.146 |
| Module element-number | 6 | 6 | 6 | 5 | 5 | 5 | 4 | 4 | 4 |
| Module spacer-number | 2 | 2 | 2 | 3 | 3 | 3 | 4 | 4 | 4 |
| Module intrinsic volume - liter | 164 | 164 | 164 | 180 | 180 | 180 | 197 | 197 | 197 |
| Module-number per batch CCD unit | 42 | 42 | 42 | 42 | 42 | 42 | 42 | 42 | 42 |
| Sequence reovery (R) - % | 75 | 85 | 95 | 75 | 85 | 95 | 75 | 85 | 95 |
| Module recovyer (MR) - % | 45.00 | 45.00 | 45.00 | 40.00 | 40.00 | 40.00 | 33.00 | 33.00 | 33.00 |
| av-Element recovery (AER) - % | 9.48 | 9.48 | 9.48 | 9.71 | 9.71 | 9.71 | 9.53 | 9.53 | 9.53 |
| av-Concentration Polarization factor | 1.17 | 1.17 | 1.17 | 1.17 | 1.17 | 1.17 | 1.17 | 1.17 | 1.17 |
| av-Flux, lmh | 20.0 | 20.0 | 20.0 | 20.0 | 20.0 | 20.0 | 20.0 | 20.0 | 20.0 |
| Cycle-number per CCD sequence | 3.67 | 6.93 | 23.22 | 4.50 | 8.50 | 28.50 | 6.09 | 11.51 | 38.58 |
| CCD sequence duration - min. | 6.02 | 11.38 | 38.14 | 7.95 | 15.02 | 50.34 | 10.84 | 20.48 | 68.65 |
| CCD cycle dutation - min. | 1.64 | 1.64 | 1.64 | 1.77 | 1.77 | 1.77 | 1.78 | 1.78 | 1.78 |
| PE-CCD engagement per sequence - min. | 1.64 | 1.64 | 1.64 | 1.77 | 1.77 | 1.77 | 1.78 | 1.78 | 1.78 |
| PE idle time per sequence - min. | 4.38 | 9.73 | 38.50 | 6.18 | 13.25 | 48.68 | 9.06 | 18.70 | 66.87 |
| Minimum applied pressure - bar | 7.5 | 7.5 | 7.5 | 7.2 | 7.2 | 7.2 | 6.9 | 6.9 | 6.9 |
| Maximum applied pressure - bar | 10.7 | 14.5 | 33.8 | 10.7 | 14.7 | 34.7 | 10.8 | 15.0 | 35.7 |
| average applied pressure - bar | 9.1 | 11.0 | 20.7 | 9.0 | 11.0 | 20.9 | 8.9 | 10.9 | 21.3 |
| HP-vfd efficiency - % | 80 | 80 | 80 | 80 | 80 | 80 | 80 | 80 | 80 |
| CP-vfd efficiency - % | 70 | 70 | 70 | 70 | 70 | 70 | 70 | 70 | 70 |
| Pressure exchange unit efficiency - % | 95 | 95 | 95 | 95 | 95 | 95 | 95 | 95 | 95 |
| average energy consumption - kWh/m3 | 0.407 | 0.473 | 0.806 | 0.399 | 0.467 | 0.813 | 0.404 | 0.475 | 0.835 |
| average TDS of permeates - ppm | 38 | 56 | 143 | 39 | 57 | 148 | 39 | 58 | 152 |
| CCD bath unit production - m3/day | 4,935 | 4,935 | 4,935 | 4,113 | 4,113 | 4,113 | 3,290 | 3,290 | 3,290 |

Noteworthy features in Table 2: Inventive systems of different module configuration (MEn; n=4-6); low energy consumption as function of recovery (0.400→0.835 kWh/m$^3$ for 75% 495% recovery); permeates of 384*152 ppm TMS with salinity order manifesting increased recovery; and inventive systems of fixed operational flux, same concentration polarization factor (1.17), with permeate output proportional to the number of elements per module in the design of maximum production capacity (4,935 m$^3$/cay) exemplified with 42ME6 units (#1.1, #1.2, and #1.3).

Benefits of Inventive Systems Over Prior Art

1. Large Scab, Low Energy, Cost-Effective SWRO-CCD Systems

Low cost continuous seawater closed circuit desalination under fixed flow and variable pressure conditions of low energy consumption and large production capacity is taught hereinabove by the periodic engagement of batch CCD unit(s) with pressure exchange means to enable concentrate brine replacement by feed and thereby, allow a batch process continued on a consecutive sequential basis. The inventive method overcomes the limitations of large intrinsic volume requirements and complex conduit lines and valve means of PCT/IL2002/000636 with two alternating side containers and of PCT/IL2004/000748 with a single side container, both of confined CCD production capacity and low cost-effectiveness. The preferred embodiment of the inventive systems in FIG. 1 and FIG. 2 are suitable for large scale consecutive sequential CCD of seawater by a process involving active/inactive PE means; whereas, the preferred embodiment of the inventive systems in FIG. 4 and FIG. 5, teach the integration of two batch CCD units with the same PE means of a continuous actuation mode with alternating engagement to each said batch CCD unit for the same time duration—systems suitable for large scale seawater desalination of low energy high-cost effectiveness.

Example #1 in Table 1 illustrates the performance a single batch CCD unit of 42ME6 configuration for 3,208 m$^3$/day desalinated seawater of 50% recovery with energy consumption of 1.831 kW/m$^3$ and permeates' quality of 347 ppm average TDS; and an integrated inventive system two batch CCD units with the same PE means of 2[42ME6] configuration for double production (6,416 m$^3$/day) under the same conditions.

2. Large Scale, High Recovery, Cost-Effective BWRO-CCD Systems of Declined Fouling Propensity While PCT/IL2002/000636 with two alternating side containers and of PCT/IL2004/000748 with a single side container can apply to low energy higher recovery desalination of brackish water desalination with unchanged membranes performance, said techniques are confined to small scale production of low cost-effectiveness due to their large intrinsic volume requirements and complex conduit lines and valve means. PCT/IL2005/000670 eliminates the needs for a side container of large intrinsic volume and extensive valve means making this technology highly cost effective for brackish water desalination of low energy and high recovery by a two-step consecutive sequential process with CCD under fixed flow and variable pressure conditions experienced most of the time (>85%) with brief periodic PFD steps of low flux and recovery to enable brine replacement by feed, and the two-step process implies frequent changes of membrane performance. The inventive systems in FIG. 1, FIG. 2, FIG. 4 and FIG. 5 teach large scale consecutive sequential CCD of brackish water of high recovery and low energy with unchanged membrane performance as previously taught by PCT/IL2002/000636 and PCT/IL2004/000748, but without intrinsic volume imitations on large scale production. The advantage of present inventive systems over PCT/IL2005/0006170 arises from thei steady unchanged membrane performance during the course of desalination, including when brine concentrate is replaced with fresh feed.

In reference to large scale desalination prospects of brackish water by the inventive systems, noteworthy are the projected performance results in Examples #1.1 (75%; 0.407 kWh/m$^3$; 38 ppm TDS; 4,935 m$^3$/day), #1.2 (85%; 0.473 kWh/m$^3$; 56 ppm TDS; 4.935 m$^3$/day), and #1.3 (95%; 0.806 kWh/m$^3$; 143 ppm TDS; 4,935 m$^3$/day) of Table 2 as applied to a 2,000 ppm NaCl feed source and a single batch CCD unit of 42ME6 configuration according to the preferred embodiment of the inventive systems in FIG. 1 and FIG. 2. Twice the production capacity (9.870 m$^3$/day) is made possible when two said batch CCD units of same configurations are operated continuously and simultaneously with the same PE means according the preferred embodiment of the inventive systems in FIG. 4 and FIG. 5. The same conceptual design can be expanded to include 3 said batch CCD units for a system of 14,805$^3$/day, 4 said batch CCD units for a system of 19.740$^3$/day, and inventive systems alike.

The invention claimed is:

1. A system for treating a feed solution by closed circuit desalination, said system comprising:
   a module containing a selected number of membrane elements and comprising a module inlet, a first module outlet for discharging a pressurized concentrate stream, and a second module outlet for discharging a permeate stream to a permeate outlet line;
   a closed circuit line connecting said first module outlet and said module inlet, said closed circuit line suitable to convey the discharged pressurized concentrate stream from said first module outlet to said module inlet;
   a recirculation pump located within the closed circuit line, said recirculation pump having a variable frequency drive;
   a high-pressure pump (HP) comprising a HP inlet for receiving the feed solution from a first path and a HP outlet for providing a pressurized feed solution to the closed circuit line;
   a pressure exchange unit (PE) comprising:
      a first PE inlet for receiving the feed solution from a second path;
      a first PE outlet suitable for providing a pressurized feed solution to the closed circuit line at a first junction point within the closed circuit line;
      a second PE inlet suitable for receiving the pressurized concentrate stream from a second junction point within the closed circuit line, said second junction point is located between the first junction point and the first module outlet;
      a second PE outlet for providing a depressurized concentrate stream to a brine effluent line;
   a plurality of valves suitable to be configured in a first mode of operation wherein
      flow is enabled to pass between the second junction point and the first junction point, and
      the pressurized concentrate stream discharged from the first module outlet is mixed with the pressurized feed solution from the high-pressure pump and conveyed to the module inlet;
   and suitable to be configured in a second mode of operation wherein
      flow is prevented between the second junction point and the first junction point, and
      the pressurized concentrate stream discharged from the first module outlet is passed through the second junction point, the second PE inlet, the second PE outlet, and into the brine effluent line, and
      feed solution passes from the second path through the first PE inlet, the first PE out, the first junction point, and into the closed circuit line; and
   a control system suitable to alternate between the first and second modes of operation.

2. The system for treating a feed solution by closed circuit desalination of claim 1, wherein a first loop comprises the module, the closed circuit line, and the recirculation pump, further wherein the system further includes a second loop comprising:
   a second module containing a selected number of membrane elements and comprising a second module inlet, a third module outlet for discharging a second pressurized concentrate stream, and a fourth module outlet for discharging a second permeate stream to a second permeate outlet line;
   a second closed circuit line connecting said third module outlet and said second module inlet, said second closed circuit line suitable to convey the second pressurized concentrate stream from said third module outlet to said second module inlet; and
   a second recirculation pump located within the second closed circuit line, said second recirculation pump having a variable frequency drive;
   wherein
      the first PE outlet is further suitable for providing pressurized feed solution to the second loop at a third junction point located within the second closed circuit line; and
      the second PE inlet is further suitable for receiving the second pressurized concentrate stream from a fourth junction point located within the second closed circuit line;
   said first mode of operation is further characterized by:
      preventing flow between the fourth junction point and the third junction point; and
      enabling the second pressurized concentrate stream to pass through the fourth junction point, the second PE inlet, the second PE outlet, and into the brine effluent line; and
   said second mode of operation is further characterized by:
      enabling the second pressurized concentrate stream to pass between the fourth junction point and the third junction point.

* * * * *